United States Patent
Mahira et al.

(10) Patent No.: US 9,512,771 B2
(45) Date of Patent: Dec. 6, 2016

(54) EXHAUST SYSTEM STRUCTURE IN INTERNAL COMBUSTION ENGINE FOR VEHICLE

(71) Applicant: HONDA MOTOR CO., LTD., Tokyo (JP)

(72) Inventors: Hiroshi Mahira, Wako (JP); Takashi Akagi, Wako (JP); Makoto Hotozuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/845,517

(22) Filed: Sep. 4, 2015

(65) Prior Publication Data
US 2016/0090889 A1 Mar. 31, 2016

(30) Foreign Application Priority Data
Sep. 30, 2014 (JP) .................. 2014-199981

(51) Int. Cl.
| | | |
|---|---|---|
| *B60K 13/04* | (2006.01) | |
| *F01N 13/14* | (2010.01) | |
| *F01N 13/00* | (2010.01) | |
| *F01N 3/28* | (2006.01) | |

(52) U.S. Cl.
CPC ............ *F01N 13/14* (2013.01); *B60K 13/04* (2013.01); *F01N 3/2803* (2013.01); *F01N 13/007* (2013.01)

(58) Field of Classification Search
CPC ...... F01N 13/00; F01N 13/007; F01N 13/14; F01N 13/141; F01N 13/143; F01N 13/148; F01N 13/1805; F01N 13/1822; F01N 13/082; F01N 2230/04; F01N 2260/20; F01N 2340/00; F01N 2340/02; F01N 2340/04; F01N 2450/20; B60K 13/00; B60K 13/04
See application file for complete search history.

(56) References Cited

U.S. PATENT DOCUMENTS

| | | | | |
|---|---|---|---|---|
| 4,609,067 A | * | 9/1986 | Gonwa ................... | F01N 13/14 126/83 |
| 4,817,985 A | * | 4/1989 | Enokimoto .......... | B62D 21/183 280/124.143 |
| 5,054,842 A | * | 10/1991 | Ishiwatari ............ | B62D 21/183 180/90.6 |
| 5,111,555 A | * | 5/1992 | Oetiker ................. | F16L 33/025 24/20 CW |
| 5,280,142 A | * | 1/1994 | Keller .................... | F01N 13/14 126/83 |
| 5,474,123 A | * | 12/1995 | Buckshaw ............ | F28F 19/002 138/110 |
| 6,438,949 B1 | * | 8/2002 | Nozaki .................. | B60K 13/04 123/184.21 |

(Continued)

FOREIGN PATENT DOCUMENTS

JP 2014-141161 8/2014

*Primary Examiner* — Joseph Rocca
*Assistant Examiner* — Travis Coolman
(74) *Attorney, Agent, or Firm* — Rankin, Hill & Clark LLP

(57) ABSTRACT

A catalytic device connected to an exhaust muffler from the front of the exhaust muffler to form substantially the shape of a T as viewed in plan is provided between an exhaust pipe and the exhaust muffler. One end portion of a reinforcing cover covering the catalytic device is fixed to an upstream end portion of the catalytic device, and another end portion of the reinforcing cover is fixed to the exhaust muffler. An extending portion extending rearwardly upward along the outer periphery of the exhaust muffler is formed integrally with the rear portion of a first heat insulating member covering the reinforcing cover from above. A second heat insulating member integrally having a cover portion covering the extending portion from above and inclined rearwardly upward is disposed so as to cover the exhaust muffler from above.

5 Claims, 7 Drawing Sheets

(56) References Cited

U.S. PATENT DOCUMENTS

| | | | | |
|---|---|---|---|---|
| 6,530,443 B1* | 3/2003 | Tsuruta | F01N 13/08 | 180/89.2 |
| 6,591,935 B1* | 7/2003 | Petley | F01N 13/02 | 180/309 |
| 6,640,927 B1* | 11/2003 | Turner | B60K 13/04 | 180/89.2 |
| 6,702,062 B2* | 3/2004 | Kusabiraki | F01N 13/08 | 181/212 |
| 7,506,712 B2* | 3/2009 | Kato | B60K 13/02 | 180/68.1 |
| 7,650,959 B2* | 1/2010 | Kato | B60G 7/02 | 180/208 |
| 2002/0166720 A1* | 11/2002 | Kusabiraki | F01N 13/08 | 181/240 |
| 2002/0185893 A1* | 12/2002 | Hashirayama | B60K 13/04 | 296/204 |
| 2004/0195034 A1* | 10/2004 | Kato | B60K 17/34 | 180/312 |
| 2004/0216942 A1* | 11/2004 | Tanaka | B60K 5/04 | 180/292 |
| 2004/0258583 A1* | 12/2004 | Hardesty | F01N 3/2853 | 422/179 |
| 2005/0139416 A1* | 6/2005 | Niwa | B60R 13/0876 | 181/207 |
| 2006/0042871 A1* | 3/2006 | Yasuda | F01N 1/24 | 181/227 |
| 2007/0256409 A1* | 11/2007 | Nishimura | F01N 3/2885 | 60/289 |
| 2007/0295002 A1* | 12/2007 | Sakurai | F01N 1/006 | 60/299 |
| 2008/0029655 A1* | 2/2008 | Mabuchi | F01N 5/02 | 248/58 |
| 2008/0098721 A1* | 5/2008 | Liu | F01N 13/14 | 60/272 |
| 2008/0127699 A1* | 6/2008 | Okada | B21D 22/14 | 72/121 |
| 2009/0000862 A1* | 1/2009 | Buell | F01N 1/083 | 181/212 |
| 2009/0183937 A1* | 7/2009 | Yamamura | B60K 13/04 | 180/89.2 |
| 2011/0225953 A1* | 9/2011 | Ono | F01N 1/02 | 60/276 |
| 2012/0055729 A1* | 3/2012 | Bessho | B60K 5/04 | 180/309 |
| 2012/0210701 A1* | 8/2012 | Usa | F01N 1/089 | 60/297 |
| 2013/0068554 A1* | 3/2013 | Hayama | F01N 13/14 | 181/228 |
| 2014/0202785 A1* | 7/2014 | Hanashima | B60K 13/04 | 180/309 |
| 2014/0216018 A1* | 8/2014 | Puschnik | F01N 3/2882 | 60/299 |
| 2014/0265285 A1* | 9/2014 | Erspamer | B60N 2/6009 | 280/783 |
| 2015/0014083 A1* | 1/2015 | Yamada | B62K 5/01 | 180/309 |

* cited by examiner

EXHAUST SYSTEM STRUCTURE IN INTERNAL COMBUSTION ENGINE FOR VEHICLE

BACKGROUND OF THE INVENTION

Field of the Invention

The present invention relates to an internal combustion engine for a vehicle in which an engine main body having a cylinder head is mounted on a vehicle body frame, and an exhaust muffler to which exhaust gas from the cylinder head is guided extends in a vehicle width direction and is disposed on a rear portion of the vehicle body frame, and particularly to an improvement in an exhaust system structure.

Description of Related Art

An exhaust system structure of an internal combustion engine for a vehicle is already known in Japanese Patent Laid-Open No. 2014-141161 in which structure a catalytic device is connected to an exhaust muffler, which extends in a vehicle width direction and is disposed on a rear portion of a vehicle body frame, from the front of the exhaust muffler to form substantially the shape of a T.

In the vehicle disclosed in the above-described Japanese Patent Laid-Open No. 2014-141161, a rear floor is provided on the rear portion of the vehicle body frame so as to be disposed above the exhaust muffler and the catalytic device. A measure is thus necessary for insulation from heat from the exhaust muffler and the catalytic device to the rear floor. In that case, it is desired that a heat insulating property be enhanced while a complex heat insulating structure is avoided.

SUMMARY OF THE INVENTION

The present invention has been made in view of such circumstances. It is an object of the present invention to provide an exhaust system structure in an internal combustion engine for a vehicle, which structure can effectively provide thermal insulation from heat from an exhaust muffler and a catalytic device while a complex structure is avoided.

In accordance with the present invention, there is provided an exhaust system structure in an internal combustion engine for a vehicle in which an engine main body having a cylinder head is mounted on a vehicle body frame, and an exhaust muffler to which exhaust gas from the cylinder head is guided extends in a vehicle width direction and is disposed on a rear portion of the vehicle body frame, the exhaust system structure including: an exhaust pipe extending in a forward-rearward direction in front of the exhaust muffler so as to guide the exhaust gas from the cylinder head; a catalytic device disposed between the exhaust pipe and the exhaust muffler, the catalytic device being coaxially connected to the exhaust pipe and connected to the exhaust muffler from a front of the exhaust muffler so as to form substantially a shape of a T as viewed in plan; a reinforcing cover covering the catalytic device, the reinforcing cover having one end portion fixed to an upstream end portion of the catalytic device and having another end portion fixed to the exhaust muffler, and the reinforcing cover being formed so as to increase in at least width along the vehicle width direction with decreasing distance to the exhaust muffler; a first heat insulating member covering the reinforcing cover from above, an extending portion extending rearwardly upward along an outer periphery of the exhaust muffler being formed integrally with a rear portion of the first heat insulating member; and a second heat insulating member disposed so as to cover the exhaust muffler from above, the second heat insulating member integrally having a cover portion covering the extending portion from above and inclined rearwardly upward.

Accordingly, the reinforcing cover covering the catalytic device strengthens the connection of the catalytic device to the exhaust muffler. In addition, because the first heat insulating member covers the reinforcing cover from above, and the second heat insulating member covers the exhaust muffler from above, thermal insulation from heat from the catalytic device and the exhaust muffler connected to each other in the shape of a T can be provided effectively while a complex structure is avoided. The manufacture of the first and second heat insulating members is facilitated, and thus productivity can be improved. In addition, the extending portion formed integrally with the rear portion of the first heat insulating member is covered by the cover portion integrally provided to the second heat insulating member, so that thermal insulation between the first and second heat insulating members can also be provided effectively.

In further accordance with the present invention, a gap that allows circulation of air is formed between the extending portion and the cover portion. Therefore, the air circulates through the gap formed between the extending portion and the cover portion. The circulation of the air inside the second heat insulating member can prevent a rise in temperature of the second heat insulating member. Furthermore, the extending portion and the cover portion inclined rearwardly upward along the outer periphery of the exhaust muffler can prevent the entry of foreign matter other than traveling wind between the second heat insulating member and the exhaust muffler, and thus prevent the soiling of the upper external surface of the exhaust muffler by the foreign matter.

In further accordance with the present invention, a front end supporting portion formed in a semicircular shape so as to abut against an upper outer periphery of the exhaust pipe is formed in a front end portion of the first heat insulating member, a band for radial positioning of the front end supporting portion with respect to the exhaust pipe is wrapped around an outer periphery of the front end supporting portion and a lower outer periphery of the exhaust pipe, and the rear portion of the first heat insulating member is fixed by bolts to both of a left side and a right side of the reinforcing cover.

Accordingly, the front end supporting portion in the front end portion of the first heat insulating member abuts against the outer periphery of the exhaust pipe and is supported by the band for the positioning of the front end supporting portion in the radial direction. The rear portion of the first heat insulating member is fixed by the bolts to both of the left side and the right side of the reinforcing cover. Thus, the sliding of the front end portion of the first heat insulating member in the axial direction along the exhaust pipe absorbs distortion of the first heat insulating member due to thermal expansion. It is therefore possible to improve reliability of the attachment of the first heat insulating member to the exhaust muffler.

In further accordance with the present invention, the catalytic device includes a housing cylinder connected to the exhaust pipe and a metal catalyst housed within the housing cylinder, a muffler case of the exhaust muffler is provided with an exhaust gas introduction hole communicating with an inside of the muffler case and provided with a supporting cylindrical portion extending frontward coaxially with the exhaust gas introduction hole, and a rear end portion of the housing cylinder is supported by the supporting cylindrical portion.

Accordingly, the rear end portion of the housing cylinder housing the metal catalyst is supported by the supporting cylindrical portion provided to the muffler case of the exhaust muffler. Thus, the metal catalyst can be brought into closer proximity to the side of the exhaust muffler, so that the first heat insulating member can be miniaturized.

In further accordance with the present invention, the rear end portion of the housing cylinder is press-fitted into the supporting cylindrical portion, and a front end of the supporting cylindrical portion is disposed forward of a rear end of the metal catalyst within the housing cylinder.

Accordingly, elongation in the axial direction of the housing cylinder due to thermal expansion can be absorbed. Because the front end of the supporting cylindrical portion is disposed forward of the rear end of the metal catalyst within the housing cylinder, a press-fitting margin for thermal deformation in the radial direction of the housing cylinder is stabilized. The catalytic device is disposed closer to the exhaust muffler, so that the first heat insulating member can be miniaturized more.

BRIEF DESCRIPTION OF THE DRAWINGS

These and further features of the invention will be apparent with reference to the following description and drawings, wherein.

DETAILED DESCRIPTION OF THE INVENTION

An embodiment of the present invention will be described with reference to the accompanying drawings. Incidentally, suppose in the following description that "front," "rear," "left," "right," "up," and "down" refer to directions as viewed from an occupant riding an off-road traveling four-wheel-drive vehicle.

Figure 1:
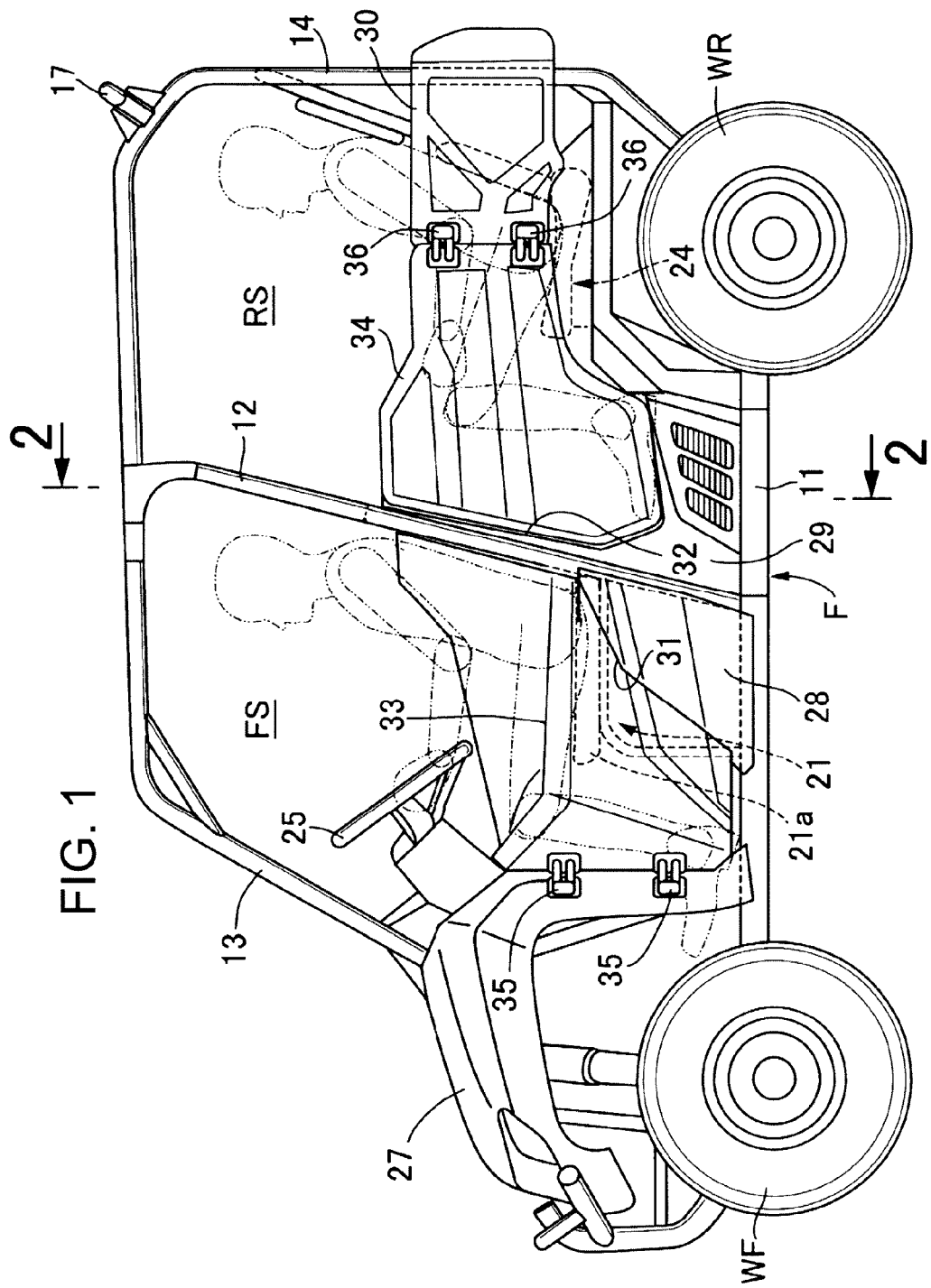
FIG. 1 is a side view of an off-road traveling four-wheel-drive vehicle.
Figure 2:
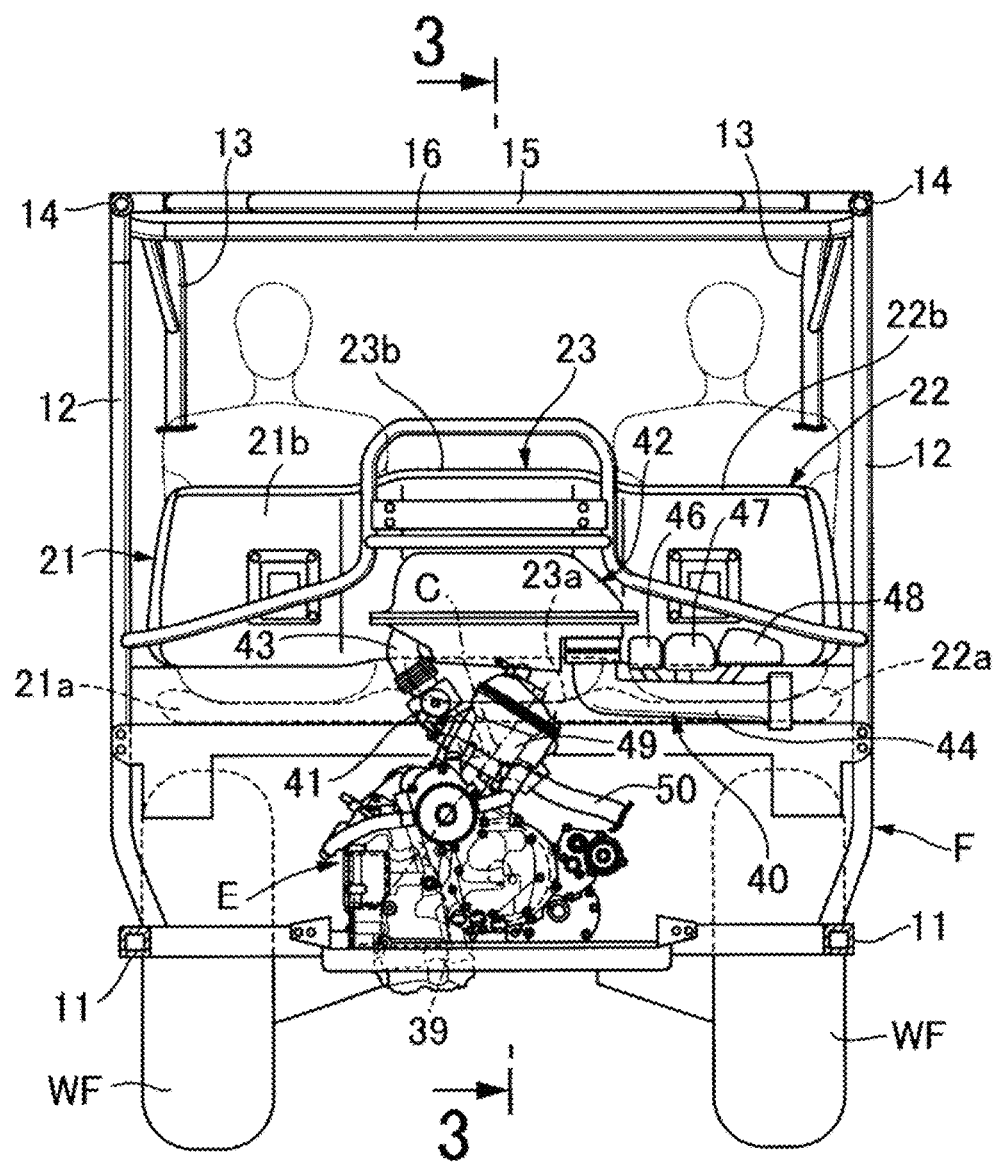
FIG. 2 is a sectional view taken along a line 2-2 of FIG. 1.
Figure 3:
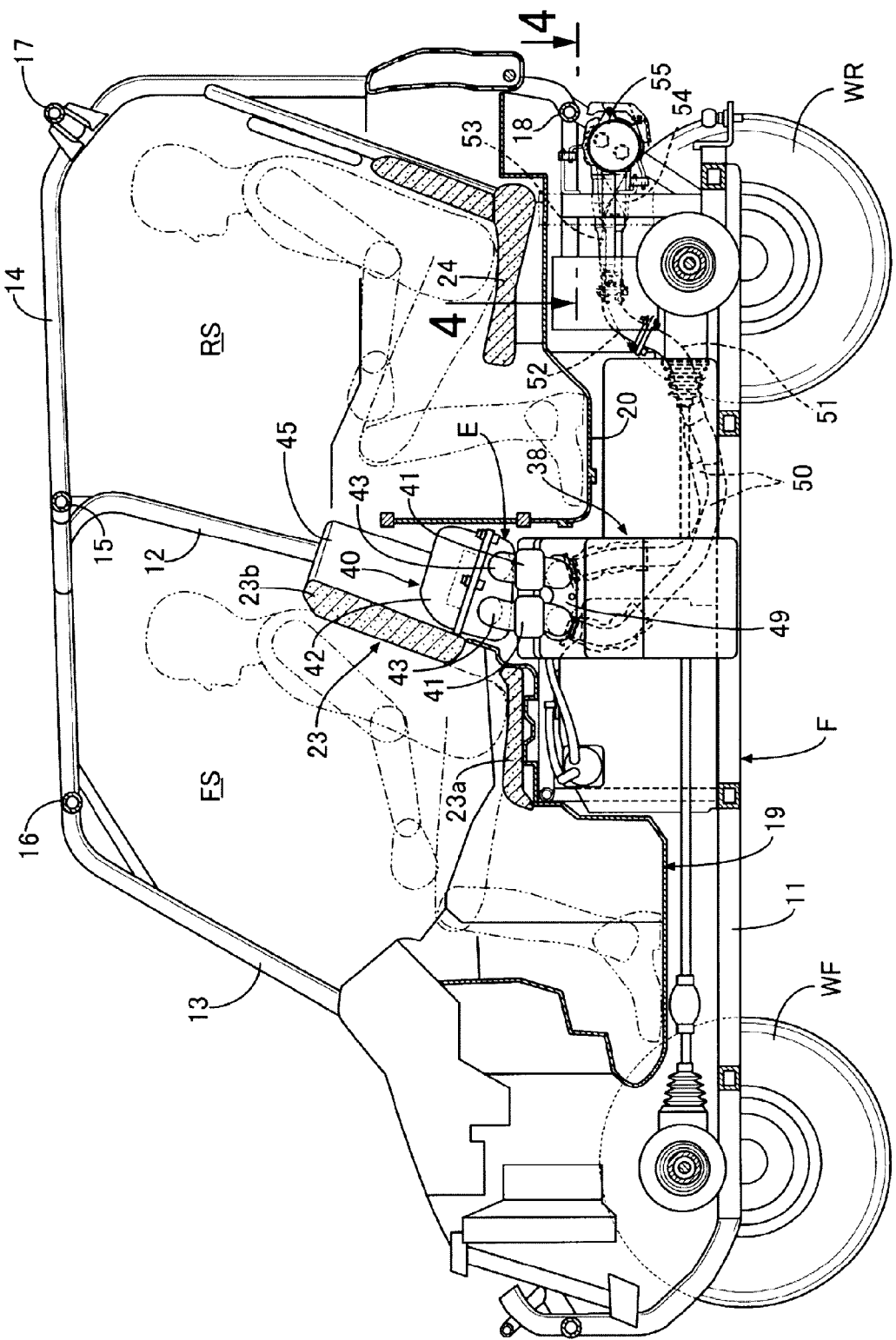
FIG. 3 is a sectional view taken along a line 3-3 of FIG. 2.

First, in FIGS. 1 to 3, left and right front wheels WF are suspended from a front portion of a vehicle body frame F of the off-road traveling four-wheel-drive vehicle as a four-wheeled vehicle. Left and right rear wheels WR are suspended from a rear portion of the vehicle body frame F.

The vehicle body frame F includes: left and right lower frames 11 extending in a forward-rearward direction; left and right center rising frames 12 rising upward from intermediate portions in the forward-rearward direction of these lower frames 11; left and right front side frames 13 extending frontward from upper ends of these center rising frames 12, and extending forwardly downward from midpoints of the left and right front side frames 13 to be connected to front portions of the lower frames 11; left and right rear side frames 14 extending rearward from the upper ends of the center rising frames 12, and extending downward from midpoints of the left and right rear side frames 14 to be connected to rear portions of the lower frames 11; a center cross member 15 coupling upper end portions of the left and right center rising frames 12 to each other; a front cross member 16 coupling intermediate bent portions of the left and right front side frames 13 to each other; an upper rear cross member 17 coupling intermediate bent portions of the left and right rear side frames 14 to each other; and a lower rear cross member 18 coupling lower portions of the left and right rear side frames 14 to each other.

The left and right center rising frames 12 and the left and right front side frames 13 form the contour of a front riding space FS for a driver and an assistant driver. The front portion of the vehicle body frame F supports a front floor 19, which enables the driver and the assistant driver to ride and is disposed in front of the center rising frames 12. In addition, the left and right center rising frames 12 and the left and right rear side frames 14 form the contour of a rear riding space RS for a passenger. The rear portion of the vehicle body frame F supports a rear floor 20, which enables the passenger to ride and is disposed in the rear of the center rising frames 12.

A driver seat 21 disposed in the rear of a steering wheel 25 for steering the left and right front wheels WF and an assistant driver seat 22 disposed on one of a left side and a right side (right side in the present embodiment) of the driver seat 21 are arranged in the front riding space FS for the driver and the assistant driver in such a manner as to be separated from each other in the vehicle width direction.

The driver seat 21 and the assistant driver seat 22 respectively include seat portions 21a and 22a and backrest portions 21b and 22b rising upward from rear portions of the seat portions 21a and 22a. In addition, a second assistant driver seat 23 is provided between the driver seat 21 and the assistant driver seat 22, the second assistant driver seat 23 having a backrest portion 23b displaced forward with respect to the backrest portions 21b and 22b of the driver seat 21 and the assistant driver seat 22, and having a seat portion 23a disposed between the seat portions 21a and 22a of the driver seat 21 and the assistant driver seat 22. On the other hand, left and right passenger seats 24 are provided in the rear riding space RS for the passenger.

The front portion of the vehicle body frame F is covered by a front cover 27. Attached to the vehicle body frame F are: left and right front side covers 28 covering a rear side lower portion of the front riding space FS from sides; left and right center side covers 29 covering a front side lower portion of the rear riding space RS from the sides; and left and right rear side covers 30 covering a rear side lower portion of the rear riding space RS from the sides. In addition, left and right front doors 33 that can open and close respective front doorways 31 formed between the front side covers 28 and the front cover 27 are respectively supported on the left and right rear portions of the front cover 27 rotatably by upper and lower hinge portions 35. Left and right rear doors 34 that can open and close respective rear doorways 32 formed between the center side covers 29 and the rear side covers 30 are respectively supported on the left and right front portions of the rear side covers 30 rotatably by pairs of upper and lower hinge portions 36.

A two-cylinder internal combustion engine E that exerts power for rotation-driving the left and right front wheels WF and the left and right rear wheels WR is mounted in the vehicle body frame F in such a manner as to be disposed in substantially a center in the forward-rearward direction of the vehicle as viewed in plan. An engine main body 38 of the internal combustion engine E is mounted in the vehicle body frame F in an attitude in which a cylinder axis C is inclined to the side of the assistant driver seat 22 in the vehicle width direction while the engine main body 38 is longitudinally mounted with the axis of a crankshaft 39 along the forward-rearward direction. The engine main body 38 is disposed below the driver seat 21 and the assistant driver seat 22 in a center in the vehicle width direction.

Directing attention to FIG. 2 and FIG. 3, an intake device 40 of the internal combustion engine E includes: throttle bodies 41 connected to respective cylinders in a cylinder head 49 of the engine main body 38; an air cleaner 42 disposed between the driver seat 21 and the assistant driver seat 22 as viewed in plan; a pair of connecting tubes 43 for establishing connection between the throttle bodies 41 and the air cleaner 42; and a single intake air duct 44 that guides air to the air cleaner 42.

The backrest portion 23b of the second assistant driver seat 23 provided between the driver seat 21 and the assistant driver seat 22 is integrally continuous with the backrest portions 21b and 22b of the driver seat 21 and the assistant driver seat 22, and is displaced forward with respect to the backrest portions 21b and 22b. The backrest portions 21b, 22b and 23b of the driver seat 21, the assistant driver seat 22, and the second assistant driver seat 23 form a recessed portion 45 recessed to the front side as viewed in plan. The air cleaner 42 is disposed in the recessed portion 45.

A downstream end of the intake air duct 44 that extends to a right side portion of the vehicle body in the rear of the seat portion 22a of the assistant driver seat 22 is connected to a right side portion of the air cleaner 42. Resonators 46, 47, and 48 are connected to a plurality of positions of the intake air duct 44.

A pair of individual exhaust pipes 50 connected to a lower side wall of the cylinder head 49 of the engine main body 38 is connected to a single first exhaust pipe 51 common to these individual exhaust pipes 50. The first exhaust pipe 51 is connected to a catalytic device 54 via a second exhaust pipe 52 and a third exhaust pipe 53. The catalytic device 54 is connected to an exhaust muffler 55 that extends in the vehicle width direction and which is disposed on a rear portion of the vehicle body frame F.

Figure 4:
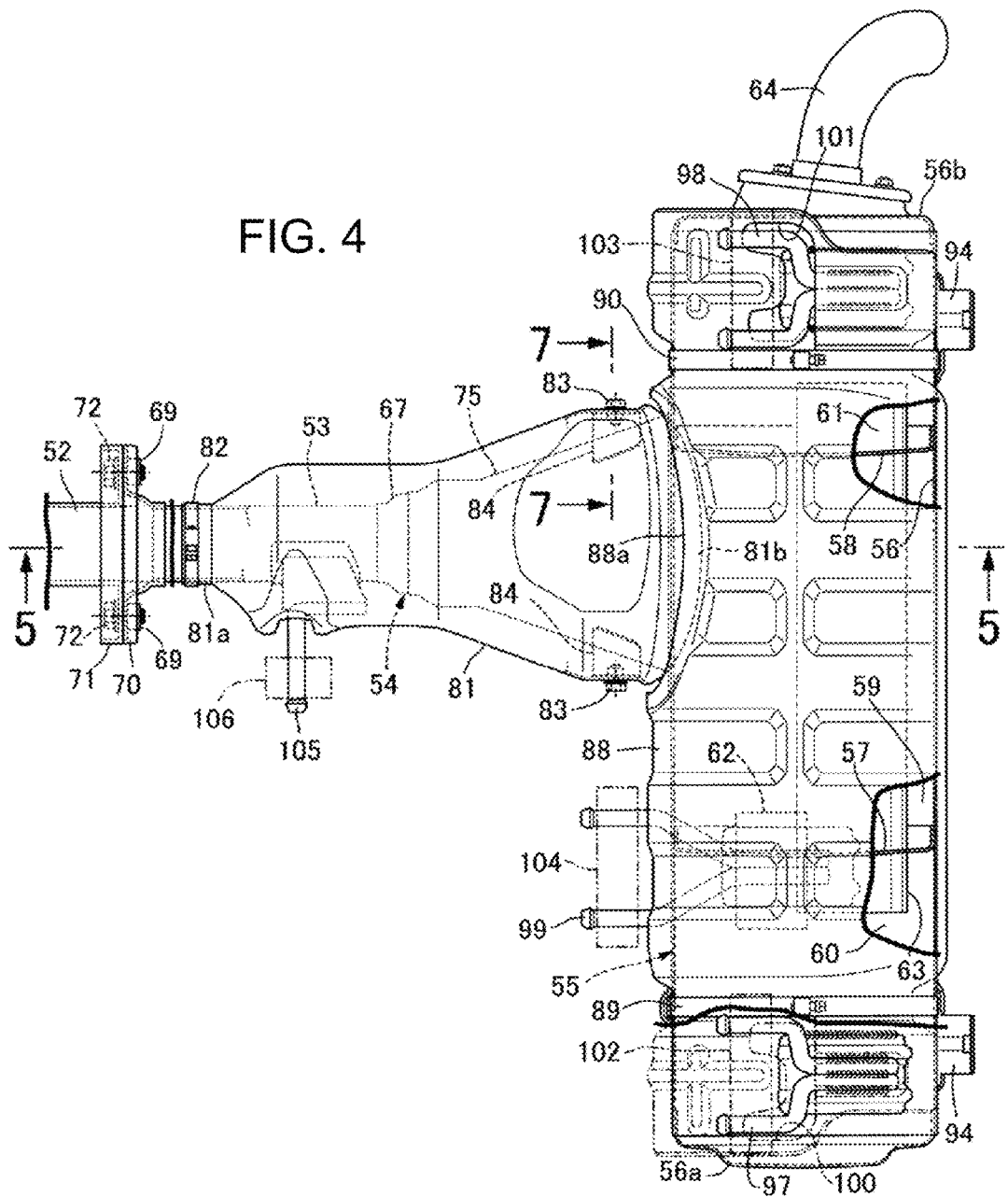
FIG. 4 is a plan view of part of an exhaust system along a line 4-4 of FIG. 3.
Figure 5:
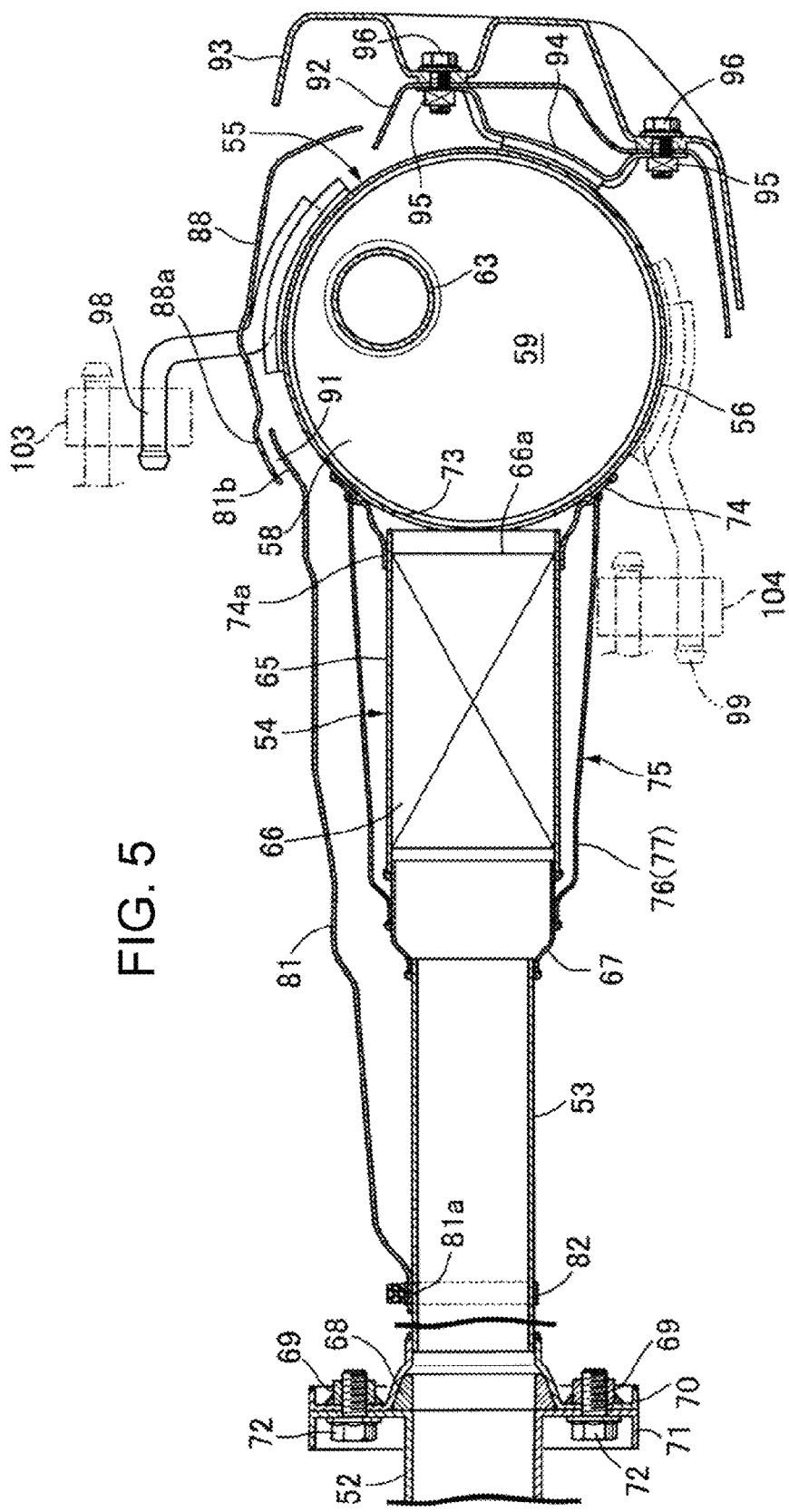
FIG. 5 is a sectional view taken along a line 5-5 of FIG. 4.
Figure 6:
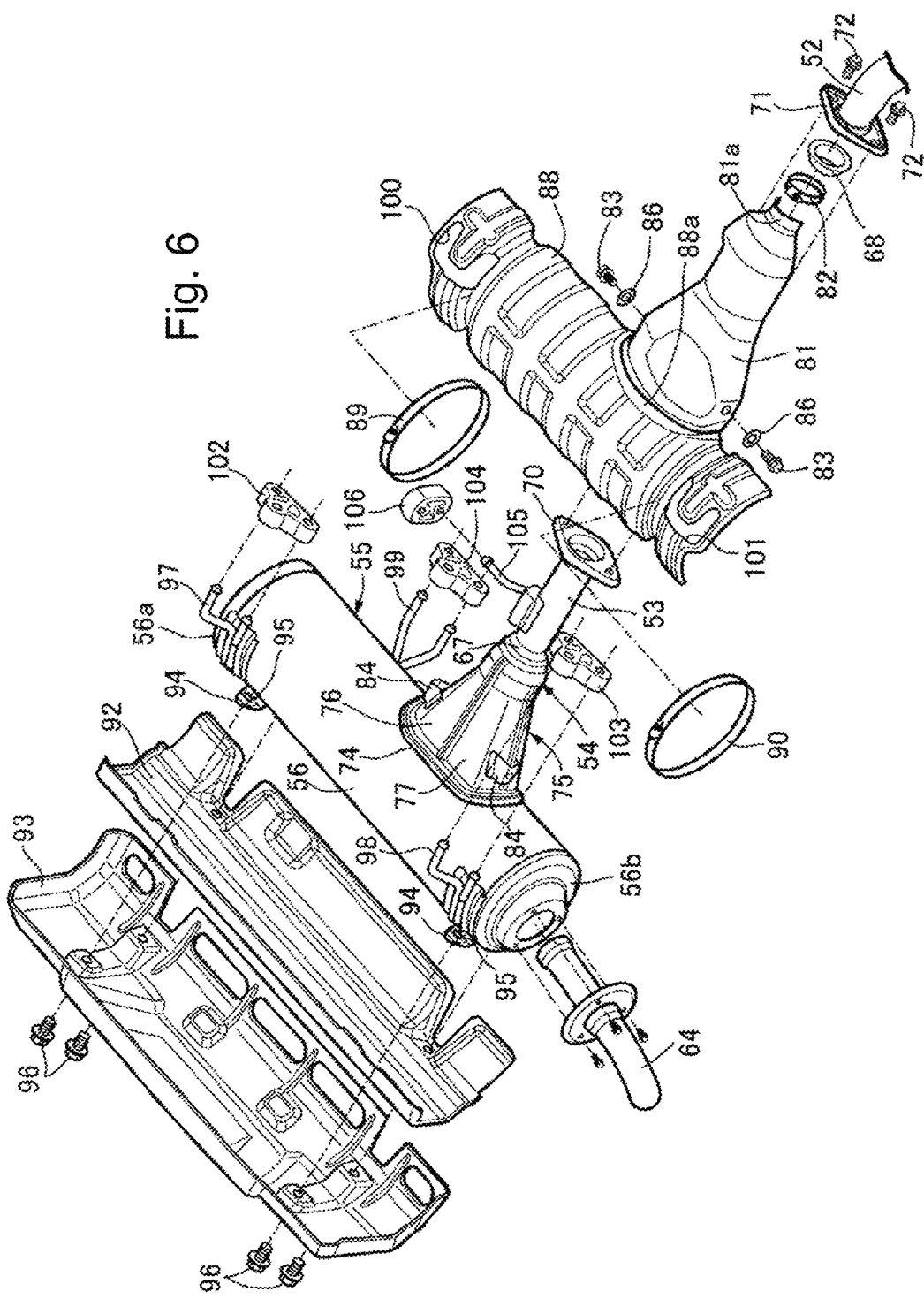
FIG. 6 is an exploded perspective view of an exhaust muffler, a catalytic device, and a final exhaust pipe; and, FIG. 7 is a sectional view taken along a line 7-7 of FIG. 4.

In FIGS. 4 to 6, a muffler case 56 of the exhaust muffler 55 is formed in a substantially cylindrical shape such that both ends of the muffler case 56 are closed by end walls 56a and 56b. A pair of partition walls 57 and 58 partition the inside of the muffler case 56 into a first chamber 59 as an intermediate portion in a longitudinal direction of the muffler case 56, a second chamber 60 between the end wall 56a on the left side of the muffler case 56 and the partition wall 57, and a third chamber 61 between the end wall 56b on the right side of the muffler case 56 and the partition wall 58.

A first communication pipe 62 for communication between the first and second chambers 59 and 60 is fixed to the partition wall 57 so as to penetrate the partition wall 57. A second communication pipe 63 for communication between the second and third chambers 60 and 61 is fixed to the partition walls 57 and 58 so as to penetrate the partition walls 57 and 58. In addition, a tail pipe 64 that communicates with the third chamber 61 is attached to the end wall 56b on the right side of the muffler case 56 such that a downstream end opening portion of the tail pipe 64 is directed in a downward direction on a rear side.

The catalytic device 54 includes: a housing cylinder 65 extending in the forward-rearward direction; a metal catalyst 66 housed within the housing cylinder 65; and a connecting pipe 67 coaxially connected to a front end portion of the housing cylinder 65. A rear end portion of the third exhaust pipe 53 is coaxially connected to a front end portion of the connecting pipe 67 by welding. In addition, a flange 70 having weld nuts 69 fixed to a plurality of positions of the flange 70 in a circumferential direction is fixed to a front end portion of the third exhaust pipe 53. A flange 71 that is provided to a rear end portion of the second exhaust pipe 52 and which has an annular seal member 68 interposed between the flange 70 and the flange 71 is fastened to the flange 70 by a plurality of bolts 72 screwed into the weld nuts 69.

An exhaust gas introduction hole 73 that communicates with the first chamber 59 is provided to a front portion of the muffler case 56 in the exhaust muffler 55, and a connecting member 74 is fixed to the front portion of the muffler case 56 by welding, the connecting member 74 having a supporting cylindrical portion 74a coaxially disposed in front of the exhaust gas introduction hole 73.

A rear end portion of the housing cylinder 65 in the catalytic device 54 is supported by the supporting cylindrical portion 74a. The catalytic device 54 that is coaxially connected to the third exhaust pipe 53 and is connected to the exhaust muffler 55 from the front to form substantially the shape of a T as viewed in plan is thereby provided between the third exhaust pipe 53, which extends in the forward-rearward direction in front of the exhaust muffler 55, and the exhaust muffler 55.

Furthermore, the rear end portion of the housing cylinder 65 is press-fitted into the supporting cylindrical portion 74a. As shown in FIG. 5, a front end of the supporting cylindrical portion 74a is disposed in front of a rear end 66a of the metal catalyst 66 within the housing cylinder 65.

The catalytic device 54 is covered by a reinforcing cover 75. The reinforcing cover 75 is formed by coupling left and right cover members 76 and 77 to each other. The cover members 76, 77 have a cross section in substantially the shape of a U opening toward the side of the catalytic device 54 so as to sandwich the catalytic device 54 from both of the left side and the right side. The reinforcing cover 75 is formed so as to increase in at least width along the vehicle width direction with decreasing distance to the exhaust muffler 55. In the present embodiment, the reinforcing cover 75 is formed in a flat shape so as to increase in width along the vehicle width direction with decreasing distance to the exhaust muffler 55.

One end portion of the reinforcing cover 75 is fixed to an upstream end portion of the catalytic device 54. In the present embodiment, one end portion of the reinforcing cover 75 surrounding the outer periphery of the connecting pipe 67 in the catalytic device 54 is fixed to the connecting pipe 67 by welding.

The other end portion of the reinforcing cover 75 is fixed to the exhaust muffler 55. The other end portion of the reinforcing cover 75 is fixed by welding to the connecting member 74 fixed to the muffler case 56 of the exhaust muffler 55.

The reinforcing cover 75 is covered by a first heat insulating member 81 from above. The first heat insulating member 81 is formed in substantially the shape of a U whose cross-sectional shape opens downward so as to go around both of the left side and the right side of the reinforcing cover 75 while covering the reinforcing cover 75 from above. Furthermore, a front end supporting portion 81a formed in a semicircular shape so as to abut against an upper outer periphery of the third exhaust pipe 53 is formed in a front end portion of the first heat insulating member 81. A band 82 for radial positioning of the front end supporting portion 81a with respect to the third exhaust pipe 53 is wrapped around an outer periphery of the front end supporting portion 81a and a lower outer periphery of the third exhaust pipe 53.

Figure 7:
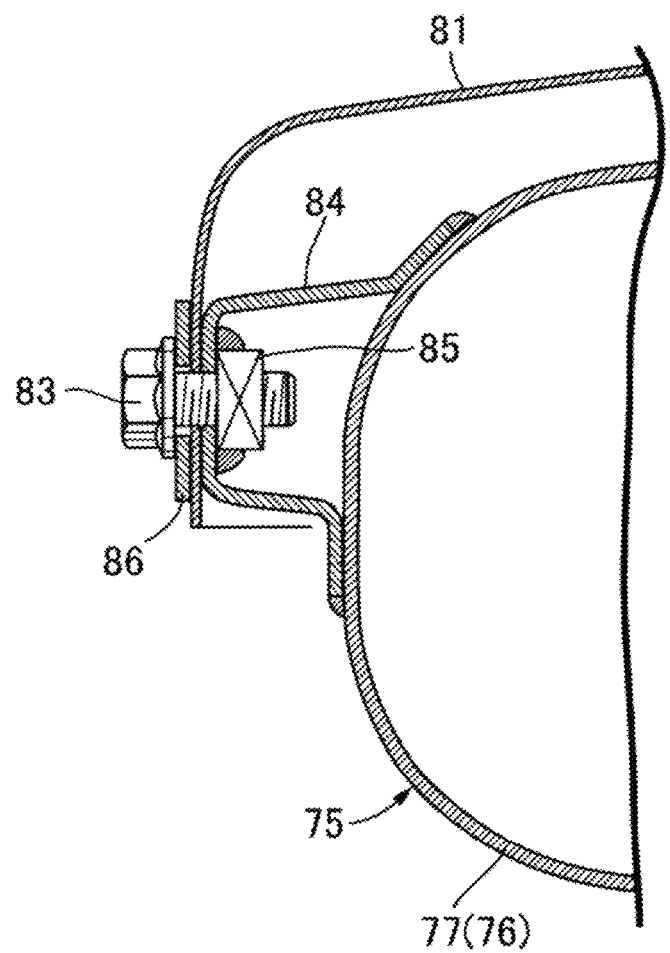

A rear portion of the first heat insulating member 81 is fixed to both of the left side and the right side of the reinforcing cover 75 by bolts 83. As shown in FIG. 7, supports 84 are fixed to rear outer walls of the left and right cover members 76 and 77 constituting the reinforcing cover 75 such that the supports 84 project sideward. Weld nuts 85 are fixed to these supports 84. The bolts 83 inserted into washers 86, the first heat insulating member 81, and the supports 84 with the washers 86 interposed between the bolts 83 and rear external surfaces on both sides of the first heat insulating member 81 are screwed into the weld nuts 85. The rear portion of the first heat insulating member 81 is fixed to both of the left side and the right side of the reinforcing cover 75 by fastening the bolts 83.

The exhaust muffler 55 is covered by a second heat insulating member 88 from above. The second heat insulating member 88 is fixed by bands 89 and 90 to both of end portions in the longitudinal direction of the muffler case 56 in the exhaust muffler 55.

An extending portion 81b that extends rearwardly upward along an outer periphery of the exhaust muffler 55 is formed integrally with the rear portion of the first heat insulating member 81. A cover portion 88a that covers the extending portion 81b from above and is inclined rearwardly upward is formed integrally with a front portion of the second heat insulating member 88. Furthermore, a gap 91 that allows the circulation of air is formed between the extending portion 81b and the cover portion 88a.

The exhaust muffler 55 is covered from the rear by a rear inner guard member 92 and a rear outer guard member 93 disposed in the rear of the rear inner guard member 92. Supporting members 94 to which a pair of upper and lower weld nuts 95 is fixed are fixed by welding to two positions of a rear side wall of the muffler case 56 in the exhaust muffler 55, the two positions being spaced apart in the longitudinal direction of the muffler case 56. The rear inner guard member 92 and the rear outer guard member 93 are fixed to the muffler case 56 by co-fastening using bolts 96 screwed into the weld nuts 95.

Exhaust muffler side hooks 97 and 98 that are formed so as to bifurcate and extend frontward are fixed to both of end portions in the longitudinal direction of an upper side wall of the muffler case 56 in the exhaust muffler 55 such that the exhaust muffler side hooks 97 and 98 pass through opening portions 100 and 101 provided in the second heat insulating member 88. An exhaust muffler side hook 99 that is formed so as to bifurcate and extends frontward is fixed to an intermediate portion in the longitudinal direction of a lower side wall of the muffler case 56. End portions of these exhaust muffler side hooks 97, 98 and 99 are inserted into and engaged with elastic members 102, 103 and 104. The elastic members 102 to 104 are also inserted into and engaged with hooks on the side of the vehicle body frame F. The exhaust muffler 55 is supported by the vehicle body frame F via the elastic members 102 to 104.

A hook 105 projecting to the left side is fixed to the third exhaust pipe 53. The third exhaust pipe 53 is supported by the vehicle body frame F via an elastic member 106 that the hook 105 is inserted into and engaged with.

Description will next be made of the action of the present embodiment. The catalytic device 54 that is coaxially connected to the third exhaust pipe 53 and is connected to the exhaust muffler 55 from the front to form substantially the shape of a T as viewed in plan is provided between the third exhaust pipe 53, which extends in the forward-rearward direction in front of the exhaust muffler 55, and the exhaust muffler 55. One end portion of the reinforcing cover 75 covering the catalytic device 54 is fixed to the upstream end portion of the catalytic device 54, and the other end portion of the reinforcing cover 75 is fixed to the exhaust muffler 55, the reinforcing cover 75 being formed so as to increase in width along the vehicle width direction with decreasing distance to the exhaust muffler 55. The extending portion 81b extending rearwardly upward along the outer periphery of the exhaust muffler 55 is formed integrally with the rear portion of the first heat insulating member 81 that covers the reinforcing cover 75 from above. The second heat insulating member 88 integrally having the cover portion 88a that covers the extending portion 81b from above and is inclined rearwardly upward is disposed so as to cover the exhaust muffler 55 from above. Hence, the reinforcing cover 75 strengthens the connection of the catalytic device 54 to the exhaust muffler 55. In addition, because the first heat insulating member 81 covers the reinforcing cover 75 from above, and the second heat insulating member 88 covers the exhaust muffler 55 from above, thermal insulation from heat from the catalytic device 54 and the exhaust muffler 55 connected to each other in the shape of a T can be provided effectively while a complex structure is avoided. The manufacture of the first and second heat insulating members 81 and 88 is facilitated, and thus productivity can be improved. In addition, the extending portion 81b formed integrally with the rear portion of the first heat insulating member 81 is covered by the cover portion 88a formed integrally with the front portion of the second heat insulating member 88, so that thermal insulation between the first and second heat insulating members 81 and 88 can also be provided effectively.

In addition, the gap 91 that allows the circulation of air is formed between the extending portion 81b and the cover portion 88a. Therefore, the air circulates through the gap 91 formed between the extending portion 81b and the cover portion 88a. The circulation of the air inside the second heat insulating member 88 can prevent a rise in temperature of the second heat insulating member 88. Furthermore, the extending portion 81b and the cover portion 88a inclined rearwardly upward along the outer periphery of the exhaust muffler 55 can prevent the entry of foreign matter other than traveling wind between the second heat insulating member 88 and the exhaust muffler 55, and thus prevent the soiling of the upper external surface of the exhaust muffler 55 by the foreign matter.

In addition, the front end supporting portion 81a formed in a semicircular shape so as to abut against the upper outer periphery of the third exhaust pipe 53 is formed in the front end portion of the first heat insulating member 81. The band 82 for the radial positioning of the front end supporting portion 81a with respect to the third exhaust pipe 53 is wrapped around the outer periphery of the front end supporting portion 81a and the lower outer periphery of the third exhaust pipe 53. The rear portion of the first heat insulating member 81 is fixed by the bolts 83 to both of the left side and the right side of the reinforcing cover 75. Thus, the sliding of the front end portion of the first heat insulating member 81 in the axial direction along the third exhaust pipe 53 absorbs distortion of the first heat insulating member 81 due to thermal expansion. It is therefore possible to improve reliability of the attachment of the first heat insulating member 81 to the exhaust muffler 55.

In addition, the catalytic device 54 includes the housing cylinder 65 connected to the third exhaust pipe 53 and the metal catalyst 66 housed within the housing cylinder 65. The muffler case 56 of the exhaust muffler 55 is provided with the exhaust gas introduction hole 73 communicating with the inside of the muffler case 56, and is provided with the supporting cylindrical portion 74a extending frontward coaxially with the exhaust gas introduction hole 73. The rear end portion of the housing cylinder 65 is supported by the supporting cylindrical portion 74a. Thus, the metal catalyst 66 can be brought into closer proximity to the side of the exhaust muffler 55, so that the first heat insulating member 81 can be miniaturized.

Further, the rear end portion of the housing cylinder 65 is press-fitted into the supporting cylindrical portion 74a, and the front end of the supporting cylindrical portion 74a is disposed forward of the rear end 66a of the metal catalyst 66 within the housing cylinder 65. Thus, elongation in the axial direction of the housing cylinder 65 due to thermal expansion can be absorbed, and a press-fitting margin for thermal deformation in the radial direction of the housing cylinder 65 is stabilized. The catalytic device 54 is disposed closer to the exhaust muffler 55, so that the first heat insulating member 81 can be miniaturized more.

An embodiment of the present invention has been described above. However, the present invention is not limited to the foregoing embodiment, but is susceptible of various design changes without departing from the present invention described in claims.

DESCRIPTION OF REFERENCE SYMBOLS

38 . . . Engine main body
49 . . . Cylinder head
53 . . . Exhaust pipe
54 . . . Catalytic device
55 . . . Exhaust muffler
56 . . . Muffler case
65 . . . Housing cylinder
66 . . . Metal catalyst
66a . . . Rear end of metal catalyst
73 . . . Exhaust gas introduction hole
74a . . . Supporting cylindrical portion
75 . . . Reinforcing cover
81 . . . First heat insulating member
81a . . . Front end supporting portion
81b . . . Extending portion
82 . . . Band
83 . . . Bolt
88 . . . Second heat insulating member
88a . . . Cover portion
91 . . . Gap
F . . . Vehicle body frame

What is claimed is:

1. An exhaust system structure in an internal combustion engine for a vehicle in which an engine main body having a cylinder head is mounted on a vehicle body frame, and an exhaust muffler to which exhaust gas from the cylinder head is guided extends in a vehicle width direction and is disposed on a rear portion of the vehicle body frame, the exhaust system structure comprising:
an exhaust pipe extending in a forward-rearward direction in front of the exhaust muffler so as to guide the exhaust gas from the cylinder head;
a catalytic device disposed between the exhaust pipe and the exhaust muffler, the catalytic device being coaxially connected to the exhaust pipe and connected to the exhaust muffler from a front of the exhaust muffler so as to form substantially a shape of a T as viewed in plan;
a reinforcing cover covering the catalytic device, the reinforcing cover having one end portion fixed to an upstream end portion of the catalytic device and having another end portion fixed to the exhaust muffler, and the reinforcing cover being formed so as to increase in at least width along the vehicle width direction with decreasing distance to the exhaust muffler;
a first heat insulating member covering the reinforcing cover from above, an extending portion extending rearwardly upward along an outer periphery of the exhaust muffler, the extending portion being formed integrally with a rear portion of the first heat insulating member; and
a second heat insulating member disposed so as to cover the exhaust muffler from above, the second heat insulating member integrally having a cover portion covering the extending portion from above and inclined rearwardly upward.

2. The exhaust system structure in an internal combustion engine for a vehicle according to claim 1,
wherein a gap that allows circulation of air is formed between the extending portion and the cover portion.

3. The exhaust system structure in an internal combustion engine for a vehicle according to claim 2,
wherein a front end supporting portion formed in a semicircular shape so as to abut against an upper outer periphery of the exhaust pipe is formed in a front end portion of the first heat insulating member, a band for radial positioning of the front end supporting portion with respect to the exhaust pipe is wrapped around an outer periphery of the front end supporting portion and a lower outer periphery of the exhaust pipe, and the rear portion of the first heat insulating member is fixed by bolts to both of a left side and a right side of the reinforcing cover.

4. The exhaust system structure in an internal combustion engine for a vehicle according to claim 3,
wherein the catalytic device includes a housing cylinder connected to the exhaust pipe and a metal catalyst housed within the housing cylinder, a muffler case of the exhaust muffler is provided with an exhaust gas introduction hole communicating with an inside of the muffler case and provided with a supporting cylindrical portion extending frontward coaxially with the exhaust gas introduction hole, and a rear end portion of the housing cylinder is supported by the supporting cylindrical portion.

5. The exhaust system structure in an internal combustion engine for a vehicle according to claim 4,
wherein the rear end portion of the housing cylinder is press-fitted into the supporting cylindrical portion, and a front end of the supporting cylindrical portion is disposed forward of a rear end of the metal catalyst within the housing cylinder.

\* \* \* \* \*